United States Patent [19]

True

[11] Patent Number: 4,755,032

[45] Date of Patent: Jul. 5, 1988

[54] MASKING OF LIGHT VALVE SPILL LIGHT

[75] Inventor: Thomas T. True, Camillus, N.Y.

[73] Assignee: General Electric Company, Philadelphia, Pa.

[21] Appl. No.: 900,641

[22] Filed: Aug. 26, 1986

[51] Int. Cl.[4] .................... G02B 27/42; G02B 27/58; G03B 21/14; H04N 9/31

[52] U.S. Cl. .................... 350/361; 350/162.11; 353/97; 358/62

[58] Field of Search .................... 350/361, 448, 162.11, 350/163; 353/97; 358/62

[56] References Cited

U.S. PATENT DOCUMENTS

| | | | |
|---|---|---|---|
| 3,290,436 | 12/1966 | Good et al. | 358/62 |
| 3,352,592 | 11/1967 | Good et al. | 358/62 |
| 3,437,746 | 4/1969 | Good et al. | 358/62 |
| 3,571,489 | 3/1971 | Coale | 350/162.11 |
| 3,702,395 | 11/1972 | Rosendahl | 353/97 |
| 3,806,236 | 4/1974 | Downing | 353/97 |

*Primary Examiner*—Bruce Y. Arnold
*Assistant Examiner*—Terry S. Callaghan
*Attorney, Agent, or Firm*—Stephen A. Young; Paul Checkovich

[57] ABSTRACT

Improved masking of light valve spill light is disclosed for Schlieren dark field light valves. The mask is deposited on the interior or exterior of the output window (58) and comprises an opaque area (90) which surrounds a transparent window area (91). The mask is characterized by a zone (92) of graduated density from transparent to opaque. The effect of the graduated density zone is to eliminate spurious light diffracted by the edges of the mask and significantly improves the performance of the light valve.

7 Claims, 6 Drawing Sheets

MASKING OF LIGHT VALVE SPILL LIGHT

BACKGROUND OF THE INVENTION

1. Field of the Invention

The present invention generally relates to improvements in light valve projection systems of the Schlieren dark field type and, more particularly to an improved masking of light valve spill light that eliminates spurious light due to diffracted light rays from the edges of conventional masks.

2. Description of the Prior Art

Light valve projection systems of the Schlieren dark field type have been in commercial use for many years and are capable of providing excellent performance. Typical prior art color projection systems of this type are shown in U.S. Pat. Nos. 3,290,436, 3,352,592 and 3,437,746, all of which were issued to W. E. Good et al. The principles of operation of this type of projection system are briefly described with reference to FIGS. 1, 2 and 3 of the drawings.

With reference first to FIG. 1, there is schematically shown a single-gun television light valve assembly comprising a lamp 10, sealed light valve 12, and Schlieren projection lens 14. The sealed light valve 12 comprises a glass envelope which contains an electron gun 16, input slots 18, focus-deflection system 20, a control layer 32 on a rotatable disk 22, and a fluid reservoir 24.

The electron gun 16 generates, from anode aperture 11, an electron beam which is used to "write" charge patterns on the control layer 32. These patterns create surface deformations in the layer and form light diffraction gratings. The electron beam is focused, deflected, and modulated by electrodes 23, 25, 27, and 21. The control layer surface deformations diffract and modulate the light rays passing through the layer 32 and disk 22.

The focus-deflection system 20 comprises three electrode sets each having four orthogonal electrodes, which form three electrode "boxes", referred to as boxes 23, 25 and 27, and a cylindrical electrode 21. The first of these, box 23, is arranged about the aperture in the input window and serves to center and allow predeflection of the electron beam. The next two boxes, boxes 25 and 27, have DC and AC voltages applied to them in a manner to achieve a uniformly focused electron beam image of aperture 11 which is scanned across the raster plane on control layer 32. This, in turn, permits the control layer fluid to be modulated uniformly by charge control to produce a uniformly colored projected image. following the focus-deflection boxes 25 and 27 is a drift ring 21 which serves, with a transparent electrode on disk 22, as an element of the final electron lens in the focus-deflection system 20.

Specific examples of light modulating fluids are disclosed in U.S. Pat. Nos. 3,288,927 to Ralph W. Plump, 3,317,664 and 3,317,665 both to Edward F. Perlowski, Jr., 3,541,992 to Carlyle S. Herrick et al, and 3,761,616 issued to C. E. Timberlake. These fluids may include additives as taught by U.S. Pat. Nos. 3,764,549 and 3,928,394 to David A. Orser. In general, the control layer or light modulating fluid is a very special chemical compound, modified with special additives, having the electro-mechanical and visco-elastic properties needed to produce effective control layer properties in the electron beam addressed light valve.

The basic light collection system includes an arc lamp 10, which may be a Xenon lamp, the arc of which is located at the focus of a reflector system, which may be a simple ellipsoidal reflector, as shown, or a compound reflector, as disclosed for example in U.S. Pat. No. 4,305,099 to Thomas T. True et al. The light from the arc is reflected from the reflector through a pair of spaced lens plates having corresponding pluralities of rectangular lenticules arranged in horizontal rows and vertical columns. The first lens plate is shown in FIG. 1 at 28 and the second lens plate is formed on the light input surface of the glass envelope of the light valve 12. The light from the lamp 10 is projected through a color filter plate 26 and the lenticular lens 28 before entering the light valve 12.

The interior surface of the glass envelope of the light valve 12 carries the input light mask in the form of slots 18 which, for example, may be applied by vapor deposition. The input slots 18 are a series of transparent slots and alternating opaque bars in a pattern generally as indicated in FIG. 1. The filtered light rays from the lamp 10 pass into the light valve 12 through these transparent slots. The lenslets of the lenticular lens 28 and the corresponding lenslets, formed on the light input surface of the glass envelope of the light valve 12, form condensing lens pairs which first focus spots of filtered light onto the slots of the light mask and then re-image the light rays onto the control layer raster plane 32. With this arrangement, efficient utilization is made of light from the arc lamp, and uniform distribution of light is produced, in a rectangular pattern, on the light modulating medium or control layer 32.

The Schlieren projection lens 14 includes Schlieren lens elements 29, output color selection bars 30 and a projection lens system 31. The output selection bars 30 are the complement of the input slots 18. That is, on the output bar plate, the bars are optically aligned with the slots of the input slots 18 so that, in the absence of a diffraction of light passing through the control layer 32, light rays are focused and terminated on the bars of the output bar plate. This creates a "dark field" condition, i.e., no light is transmitted in the absence of a modulating signal superimposed on the raster scanning signals applied to the horizontal and vertical deflection plates of the deflection system 20. It should be noted, however, that the electron beam which scans the raster and provides charge to the control layer is a constant current electron beam, there being no modulation of the intensity of the beam produced by the electon gun 16 (other than during the horizontal and vertical retrace intervals when the beam is off).

The lower half of FIG. 1 shows the cross sections of the light body and light valve components. The spectral diagrams at the bottom indicate how the light is prefiltered before entering the light valve.

FIG. 2 is a simplified light valve diagram showing the color selection action of the three basic gratings. The control layer 32 which is supported by the disk 22 (shown in FIG. 1) is illustrated as having three different diffraction gratings for red, green and blue light components. These diffraction gratings may be written individually or simultaneously and normally are actually superimposed but, for purposes of illustration only, they are shown in FIG. 2 as separated on the control layer 32.

In the light valve projection system shown in FIGS. 1 and 2, green light is passed through the horizontal slots of the input bar plate 18 and is controlled by charge generated diffraction gratings formed by modulating the height of the scanned raster lines on the control layer 32. This is done by controlling the amplitude of a high frequency carrier applied to the vertical deflection plates as modulated by the green video signal as shown in FIG. 3. Magenta (red and blue) light is passed through the vertical slots of the input bar plate 18 and is controlled by charge generated diffraction gratings created at right angles to the raster lines by velocity modulating the electron spot as it is scanned in the horizontal direction. In the example shown in FIG. 3, this is done by applying a 16 MHz (12 MHz for blue) signal to the horizontal deflection plates and modulating it with the red video signal as shown in FIG. 3. The grooves created in the control layer 32 have the proper spacing to diffract the red portion of the spectrum through the vertical output slots in plate 30 while the blue portion is blocked. (When the 12 MHz carrier is used, the blue light is passed by the vertical slots in plate 30 and the red light is blocked.)

Thus, three simultaneous and superimposed primary color pictures can be written with the same electron beam and projected to the screen 33 as a completely registered full color picture. Colors are created by writing miniture diffraction gratings within each picture element on the fluid surface by manipulating the single scanning electron beam. These gratings diffract the transmitted light rays away from their terminations at the output bars where they are spatially filtered to let the desired color reach the screen. The amount of light diffracted is dependent on the depth of the gratings formed in the control layer. This technique permits a full color television picture to be written on a single control layer with no need for further registration.

FIG. 3 shows in block diagram form the basic light valve projector circuitry. A composite video signal is supplied to the input of a decoder 34 which provides at its output red, blue and green video signals. These signals are respectively applied to modulators 36, 38 and 40. A grating generator 42 supplies carrier signals which, in the case illustrated, have frequencies of 16 MHz and 12 MHz, respectively, to modulators 36 and 38 and a signal having a frequency of 48 MHz to modulator 40. The outputs of the red an blue modulators 36 and 38 are combined and superimposed on the horizontal deflection signal from the horizontal deflection signal generator 44. The output of the green modulator 40 is superimposed on the vertical deflection signal from the vertical deflection generator 46.

The basic Schlieren dark field light valve projector as schematically illustrated in FIGS. 1, 2 and 3 has evolved over a period of years to be a highly efficient projector producing excellent quality pictures of good color balance and high resolution. A problem has arisen with newer models of the light valve due to the use of a thicker output window which causes a mask, normally on the outside of the output window, to be too far from the focal plane (control layer) to provide total elimination of the re-imaged filtered light which surrounds the diffraction gradings formed on the control layer 32: This lead to an investigation of various locations and designs which culminated in the present invention.

The use of light masks in projection systems is, of course, known in the art. Such masks have been used in Schlieren dark field light valve projectors, as mentioned above. Other examples in the prior art are shown by U.S. Pat. Nos. 3,702,395 to Rosendahl and 3,806,236 to Downing. Both of these patents show examples of projection systems using high intensity light sources. In the Downing patent, a mask plate is positioned immediately adjacent a film. Rosendahl discloses two embodiments. In one, a mask plate is placed at the focal point, while in the other, a mask plate is placed adjacent a transparency. In both the Downing and Rosendahl patents, the purpose of the mask plates is to block stray light. Similar teachings may be found in U.S. Pat. Nos. 1,630,616 to Hill and 2,019,698 to Fischer et al. In particular, Fischer et al shows mask plates on either side of a film.

SUMMARY OF THE INVENTION

It is an object of this invention to provide improvements in the design and manufacture of light valve projection systems of the Schlieren dark field type.

It is another more specific object of the invention to provide an improved mask for a light valve of the type described wherein spurious light diffracted from the edges of the mask is effectively eliminated.

According to the present invention, the mask is deposited on the interior or exterior of the output window, and the mask edges are characterized by a graduated density from clear to opaque. The inside surface of the output window is close to the focal plane, or control layer, of the light valve, which is desirable for minimizing spill light. However, the mask may be applied to the exterior, or air side, of the output window with similar results. The variable density edges of the mask provide an unexpectedly good result in eliminating spurious light. This has been shown by direct experimental comparison of the conventional sharply defined edges of the prior art masks and the new variable density edges of the present invention. It may be desirable for some applications to use the variable density edge mask in combination with a mask on the electron gun side of the control layer. In a specific embodiment, it is possible to place this mask about 2 mm from the control layer without wetting or bridging the fluid. Converging rays of light and a diverging electron beam give special benefits to this location. When used in combination with the variable density edge mask on the inside of the output window, superior results in light valve performance have been obtained. It is also possible, especially, when the variable density edge mask is applied on the inside of the output window, to employ yet another mask on the exterior of the output window. Both the second mask and the third mask, if used, are of conventional design.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE PREFERRED EMBODIMENT OF THE INVENTION

Figure 4:
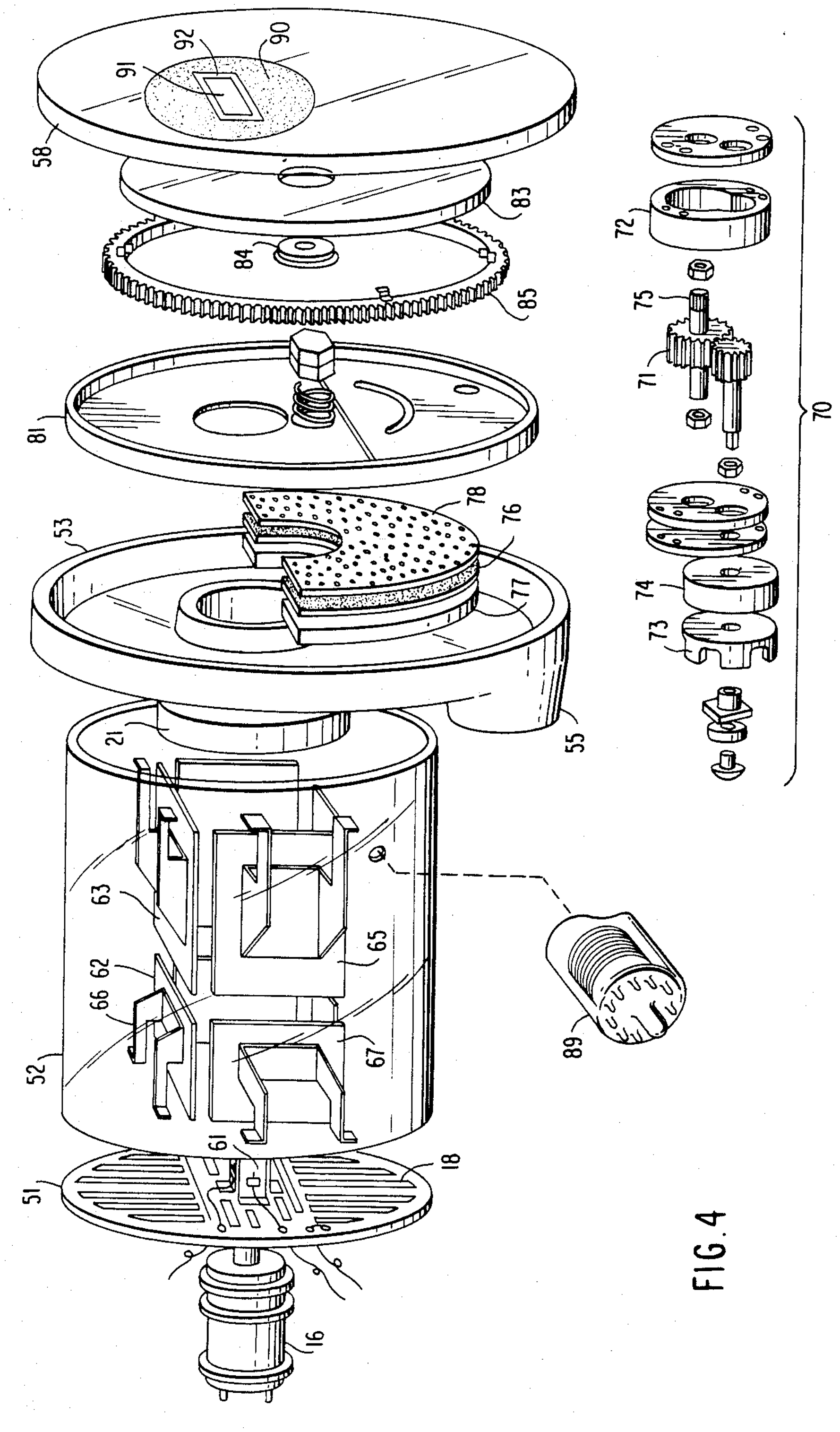
FIG. 4 is an exploded perspective view of major elements of a new generation of light valves which embody the invention.

In the drawings, like reference numerals used in the several figures indicate the same or corresponding components. Referring again to the drawings, and more particularly to FIG. 4, there is shown an exploded view of the internal vacuum components of the new generation Schlieren dark field light valves. The vacuum enclosure comprises an input window 51, a focus deflection cylinder 52, a rear housing 53 which has a molded recess 55 for receiving a pump assembly 70, and a face plate 58. The electron gun assembly 16 is attached to a central aperture of the input window 51, and the input slots or bar plate 18 are formed on the interior surface of the input window 51, functionally similar to the earlier light valves of this type.

The focus and deflection assembly comprises three sets of electrodes. One set of four electrodes 61, comprising a pair of horizontal plates and a pair of vertical plates, is attached to the input window 51 about its central aperture. A pair of vertical deflection plates 62 and a pair of horizontal deflection plates 67 located within the cylinder 52 form the second set. The third set is comprised of the vertical deflection plates 63 and the horizontal deflection plates 65. As shown in FIG. 4, the deflection plates 62, 63, 65, and 67 are supported within the cylinder 52 by means of brackets 66 which also provide the electrical connections to the deflection plates. Beyond the deflection plates 63 and 65 and within the rear housing 53 is a cylindrical drift ring 21 which, with a transparent electrode (not shown) on a rotatable disk 83, completes the focus-deflection system.

A gear pump assembly, generally indicated at 70, is located within recess 55 of the rear housing 53. The gear pump comprises gears 71 within a housing 72 driven by a magnet 73. The magnet 73 is coupled to a rotating magnet driven by an electric motor (not shown) axially aligned with the pump 70 on the exterior rear face of the recess 55 that houses the pump. An axial shield 74 is provided for the magnet 73 so that its magnetic field does not affect the electron beam. Other magnetic shielding is provided within the light valve projection system to prevent the electron beam from being affected by magnetic fields at the projector or due to the earth's magnetic field.

Figure 1:
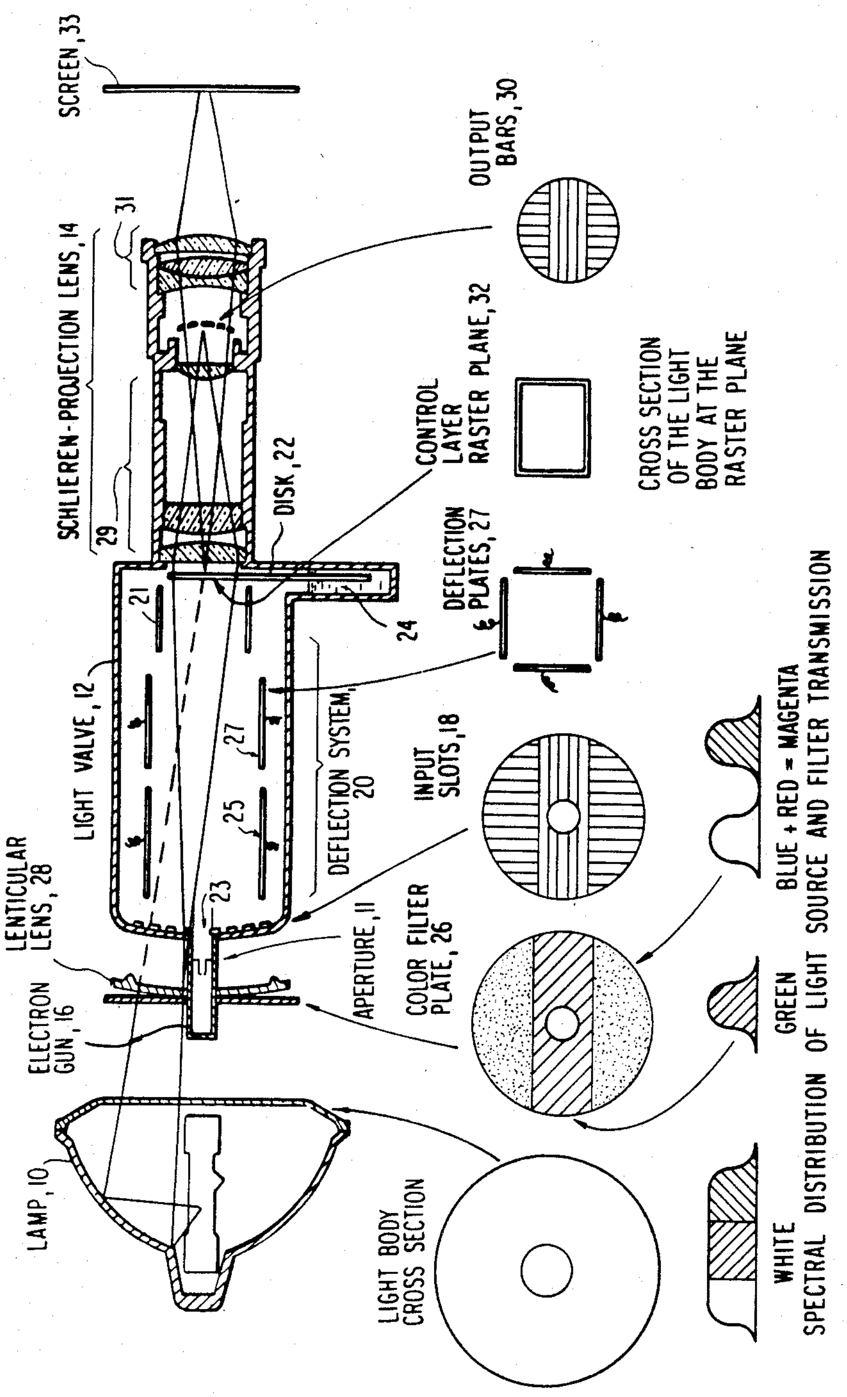
FIG. 1 PRIOR ART
FIG. 1 is a simplified cross-sectional view showing the construction of a prior art light valve projection system.
Figure 2:
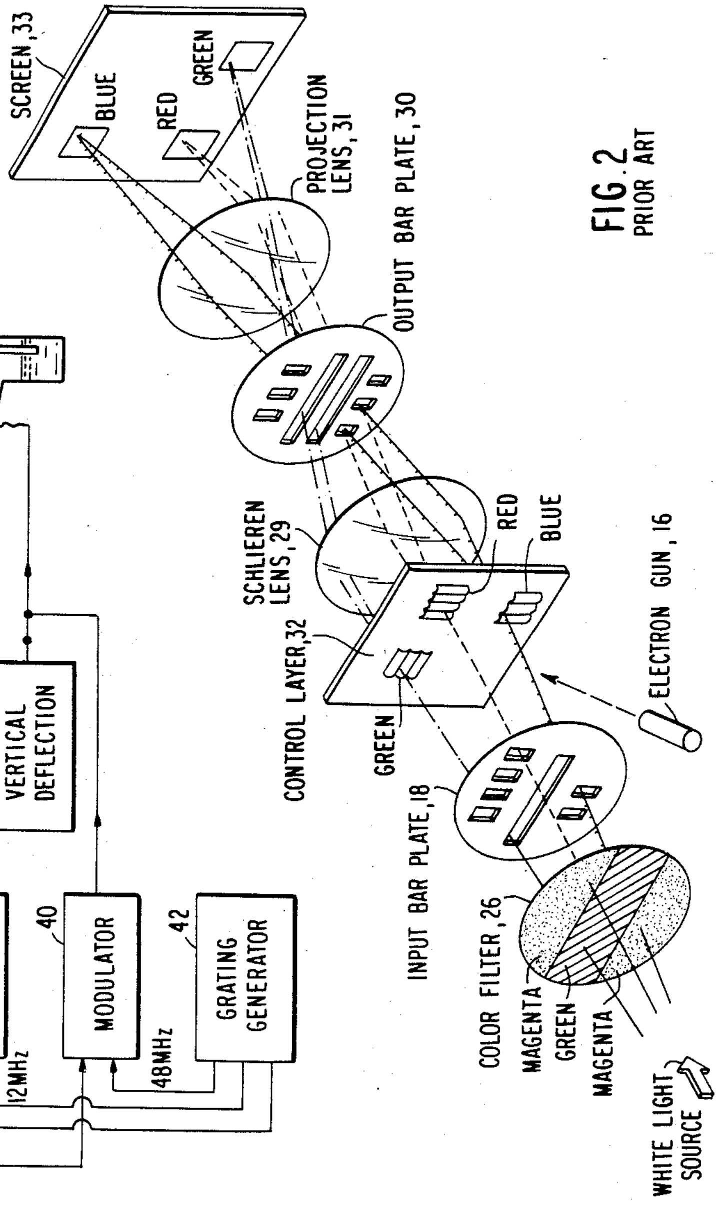
FIG. 2 PRIOR ART
FIG. 2 is a simplified perspective view illustrating the principles of operation of the prior art light valve projection system.
Figure 3:
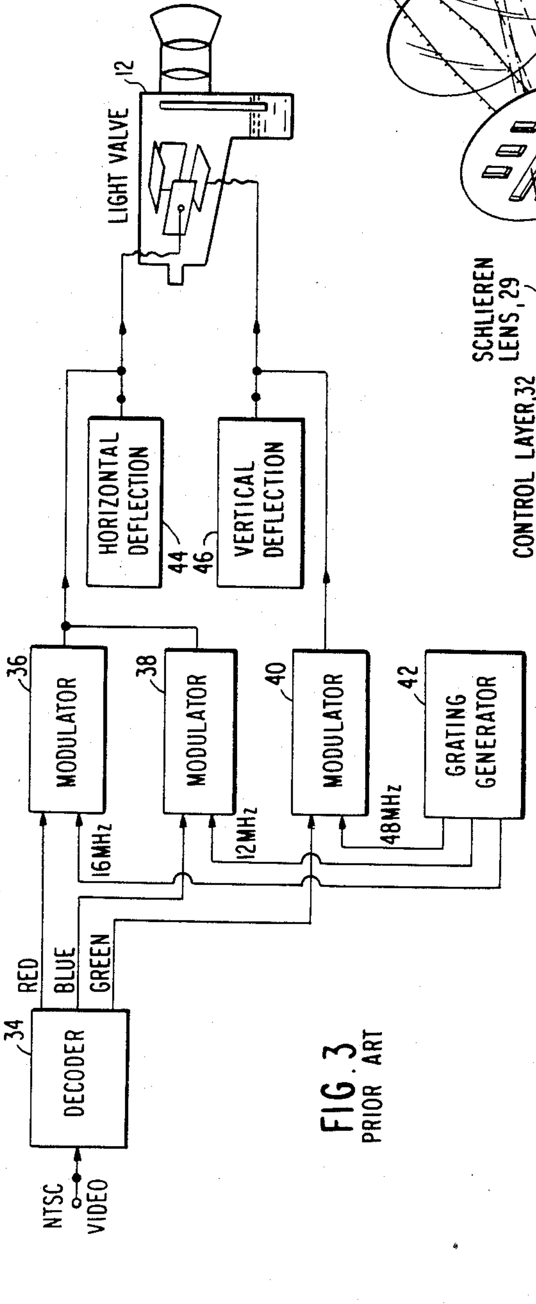
FIG. 3 PRIOR ART
FIG. 3 is a block diagram showing the basic circuitry of a modulated deflection system of the prior art light valve projection system.

The rear housing 53, including the recess 55 which houses the pump assembly 70, and the face plate 58 generally define the reservoir 24 (schematically illustrated in FIG. 1) which contains the light modulating fluid. The pump assembly 70 is located in the reservoir 24 and operates to pump the fluid through a filter 76. The filter 76 is sandwiched between a filter housing 77 and a perforated panel 78, and this assembly is secured to the lower rear face of a baffle 81. The baffle 81 is a generally circular disk with a forwardly projecting flange which surrounds the disk 83. The disk 83 is supported for rotation by a bearing 84 through which projects a pin mounted in the center of baffle 81. A ring gear 85 is attached to the peripheral edge of the disk 83 and is driven by a pinion 75 that projects from the gear pump assembly 70.

Attached to the side of the cylinder 52 is a vacuum maintenance device 89, which collects gaseous materials which remain in the envelope after it is sealed and which are generated as a product of the operation of the light valve.

Figure 5:
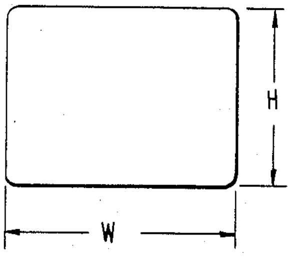
FIG. 5 is a plan view of the mask used in the light valve showing its basic dimensions.

FIG. 5 shows a plan view of a mask and its basic dimensions. The mask is formed, preferably, on the inside surface of the output window 58 by vapor deposition or other suitable process. An alternative location for the mask is on the exterior, or air side, of the window. A conventional mask may be positioned before the raster on the electron gun side of the disk 83. In a specific embodiment, the mask on the electron gun side is spaced 2 mm from the disk 83 which is sufficient to prevent wetting or bridging of the control fluid. The mask on the output window is approximately the same optical distance from the control layer side of the disk 83. For the specific embodiment mentioned the minimum dimensions for the two masks are set forth in the following table:

| Mask Position/Dimension | H | W |
|---|---|---|
| 2 mm before raster | .84795" | 1.1204" |
| output window | .8657" | 1.1442" |

For the specific embodiment described, these dimensions are the threshold below which some illumination shading will be introduced at the edge of the projected image.

Figure 6:
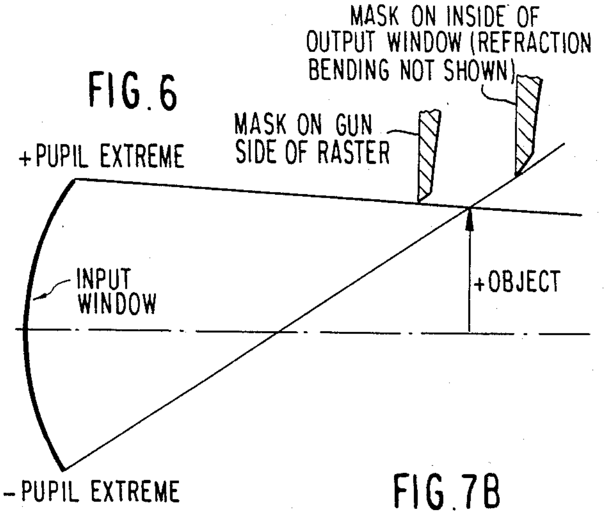
FIG. 6 is a diagramatic illustration showing the geometrical considerations in determining the dimensions of the mask.

From an optical standpoint, there is no strong preference between the two locations, but there is better performance if masks are placed at both locations. The reason for this is illustrated in FIG. 6. The extreme ray from the upper side of the input window determines the minimum dimension of the near mask, but this allows all of the spill light from the negative side to illuminate the region outside the raster. Similarly, for the mask located beyond the raster, the extreme ray from the negative side of the input window determines the minimum dimension, and light from the positive pupil can still give spill light outside the raster. A combination of two masks can eliminate spill light from both sides of the input window and, therefore, will more effectively darken the surround regions of the image.

An unfortunate characteristic of knife edges which are placed within Schlieren dark field optics is that the edge transition from transparent to opaque causes diffraction of light wave-fronts. The exact perturbation on the phase interference will depend upon whether the knife edge is a conductor or a dielectric material, but the result is similar. Rays which skirt the edge of the knife edge are deviated into an angular spectrum surrounding the original ray trajectory. The angular deviation spectrum energy illuminates the Schlieren bars, and some of it passes through to spoil the dark field.

Figure 7A:
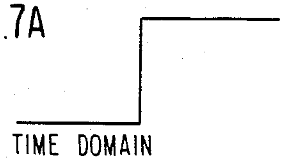
FIG. 7 is a graph illustrating the relationship between electrical signal response in an electrical filter and a step-function input waveform.
Figure 7B:
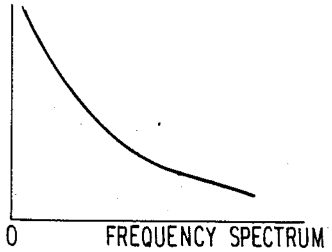
Figure 8A:
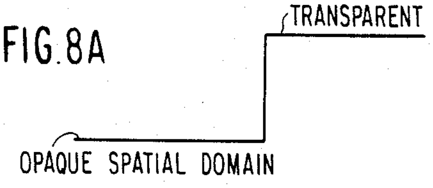
FIG. 8 is a graph illustrating the analogous relationship between optical signal response in an optical filter and a step-function input waveform.
Figure 8B:
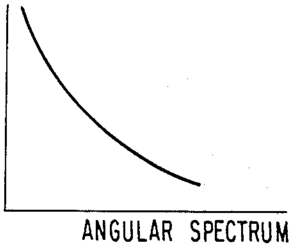
Figure 9A:
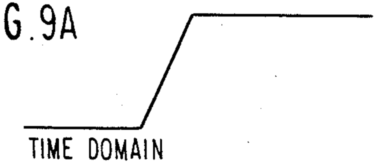
FIG. 9 is a graph illustrating the relationship between electrical signal response in an electrical filter and a slowly rising stepfunction input waveform.
Figure 9B:
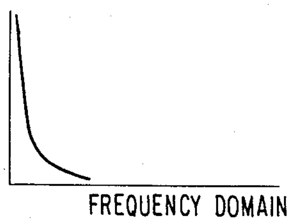
Figure 10A:
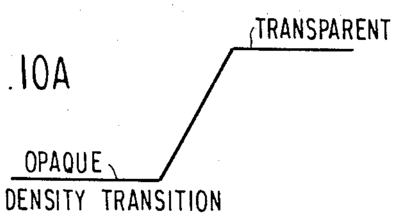
FIG. 10 is a graph illustrating the analogous relationship between optical signal response in an optical filter and a step-function input waveform.
Figure 10B:
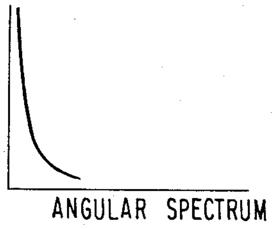

The combination of the two masks lessens the diffraction edge light rather than increases it. This is because each mask lowers the total light illuminating the other mask. However, for a mask which is located on a glass surface such as the output window of the light valve, the invention provides a way to completely eliminate the edge light caused by diffraction. To understand how this is accomplished, an analogy is made between the spectral relations of optical spatial filters and electrical filters. Mathematically, the relationships for both can be expressed by Fourier transform equations. In electrical filters the rise time of a step-function input waveform will become longer as the bandwidth of the filter is reduced. This relationship is shown in FIG. 7 of the drawings. A comparison of the response of an optical spatial filter for a step-function waveform, i.e., one which makes an abrupt transition between the opaque spatial domain to the transparent spatial domain, shows a similar relationship as shown in FIG. 8. Correspondingly, the frequency spectrum of a slowly rising step-function is narrower than that of a steeply rising waveform as shown in FIG. 9 for the electrical case and in FIG. 10 for the optical case. FIG. 10 represents the density transition from opaque to transparent of the edges of the mask which is formed on the interior surface of the output window of the light valve according to the invention. As shown in FIG. 10, as the transition becomes less steep, the angular spectrum becomes narrower.

Figure 14:
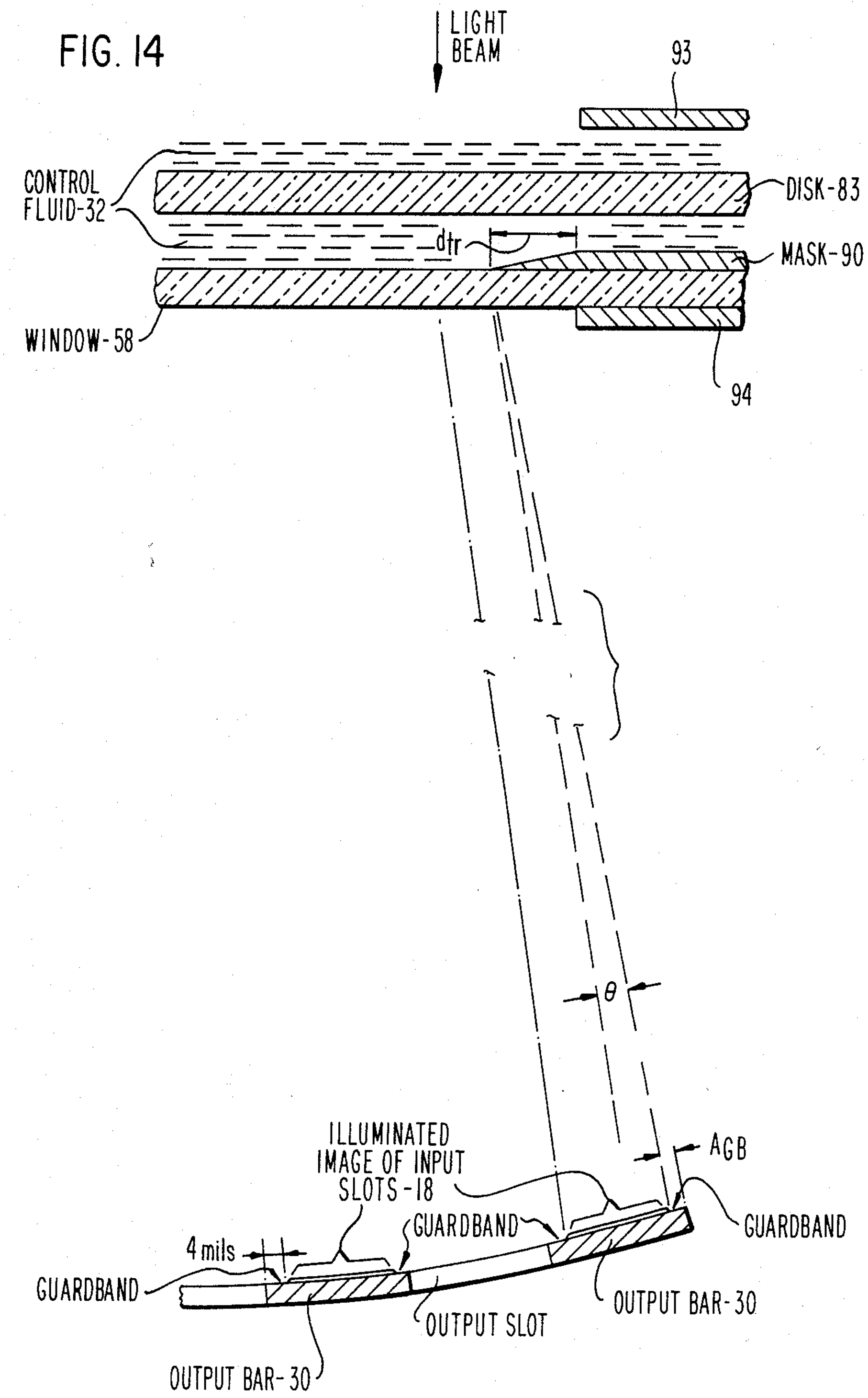
FIG. 14 is a cross-sectional view of the optical mask and the output bars when illuminated by the image of the input slots.

FIG. 14 represents a variable density mask 90 having a transition dimension designated as $d_{tr}$ which provides a gradual or smooth transition from transparent to opaque at the mask edge. The mask 90 will provide a narrow angular spectrum of diffraction around the edge of the mask. This angular spectrum is indicated as the angle $\theta$ between the dashed lines extending from the window 58 toward the output bar 30. The angle subtended by this diffraction spectrum overlies a portion of the original ray trajectory of the illuminated image of the input slot. However, the diffraction spectrum does not overlap the output bars and thus, does not pass through the open slots. The non-illuminated space between the edges of the output bars 30 and the illuminated image of the input slots 18 is the "guard band" of the Schlieren dark field system.

If we assume that the guardband of the dark field system is approximately 1.6 milliradians (4 mils at the bar surface), then we can calculate the transition slope at the edge of the mask which will keep the diffracted light within the guardband. Using approximations, I relate angular spectrum to mask transition space as follows:

$$d_{tr} = \frac{.805\lambda}{A_{GB}}$$

where $d_{tr}$ is the transition dimension from opaque to transparent, $\lambda$ is the wavelength of incident light, and $A_{GB}$ is the Schlieren angular guard bands. If $\lambda = 0.55$ microns, and $A_{GB} = 1.6 \times 10^{-3}$ radians, then $d_{tr} = 276.72$ microns or 0.0109 inches Thus, if the transition from opaque to transparent at the mask edge can be distributed over an 11 mil or larger space, then the diffracted light is contained within the guard bands of the Schlieren optics and produces no edge light.

Figure 11:
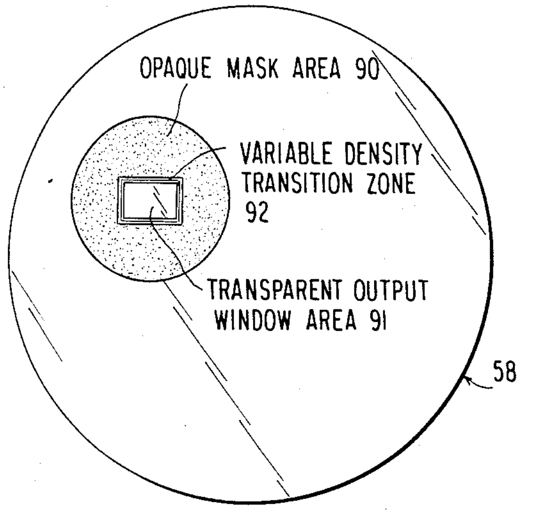
FIG. 11 is a plan view showing the mask according to the invention deposited on the output window of a light valve and having graduated density edges.

With reference to FIGS. 4 and 11, the variable density mask according to the invention is shown applied to the output window 58 of the light valve. The mask comprises an opaque mask area 90 which surrounds a transparent ouput window area 91. The area 90 is shown as circular, corresponding to the spherical optics of the Schlieren projection lens 14, but any geometrical shape will suffice as long as there is sufficient overlap between the opaque mask area 90 and the entrance pupil of the Schlieren projection lens 14. The transparent ouput window area 91 is rectangular in shape and has dimensions corresponding to the raster image. Between the opaque mask area 90 and the transparent output window area 91 is a variable density transition zone 92. The width of this transition zone is $d_{tr}$.

Figure 12:
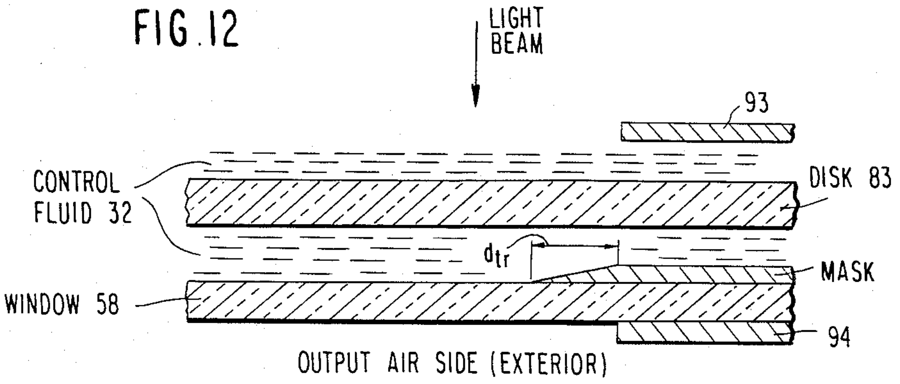
FIG. 12 is a cross-sectional view of the optical mask placed on the vacuum/fluid side of the output window showing the dimension $d_{tr}$ from the transparent to opaque areas.
Figure 13:
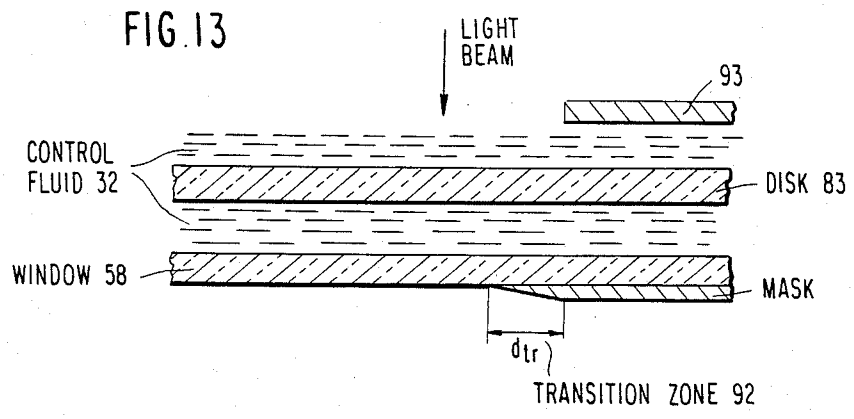
FIG. 13 is a cross-sectional view of the optical mask placed on the exterior (or air side) of the output window.

FIGS. 12 and 13 show alternative placements of the variable density mask according to the invention. Specifically, in FIG. 12, the mask is applied to the interior, vacuum or fluid side of the output window 58. In FIG. 13, the mask is applied to the exterior, or air side, of the output window 58. Either location will produce similar results. Both FIGS. 12 and 13 show the location of a second mask 93 on the electron gun side of the the disk 83. As mentioned, this mask 93 is optional, but when used in combination with the variable density edge mask according to the invention, provides superior results. It is also possible, especially in the case of FIG. 12, to employ yet another mask 94 on the exterior of the output window to further enhance performance.

The general effect of a soft edge transition was verified by using photographic film in the Schlieren dark field system on an optical bench. Edge diffraction was indeed eliminated when a film emulsion transition went from transparent to opaque.

While the invention has been disclosed in terms of a preferred embodiment, with various alternatives and modifications, those skilled in the art will recognize that the invention may be applied to other systems and practiced with variations within the scope and spirit of the appended claims.

Having thus described my invention, what I claim to be new and desire to secure by Letters Patent is as follows:

1. In a light valve of the Schlieren dark field type having a deformable light modulating control layer closely spaced from an output window, an electron gun and deflection assembly for generating and scanning an electron beam onto said deformable light modulating control layer in a raster to deform the surface of said layer, and a source of light for projecting light through an area of the raster scanned onto said deformable light modulating control layer, the improvement comprising a mask formed on said output window in optical alignment with and having dimensions related to said raster, said mask having edges formed with a variable density from transparent to opaque over a space sufficient to contain diffracted light within a "guard band" of the Schlieren dark field optics.

2. The improvement in a light valve of the Schlieren dark field type as recited in claim 1 wherein said light valve further comprises a rotatable disk closely spaced from said output window and a reservoir containing a light modulating fluid for coating said disk, said disk being rotatable partially within said reservoir, said fluid coating said disk being said deformable light modulating control layer.

3. The improvement in a light valve of the Schlieren dark field type as recited in claim 2 wherein said mask is formed on an interior surface of said output window.

4. The improvement in a light valve of the Schlieren dark field type as recited in claim 3 further comprising a second mask positioned adjacent to said disk on a side opposite to said output window and in optical alignment with said first mentioned mask.

5. The improvement in a light valve of the Schlieren dark field type as recited in claim 4 further comprising a third mask on an exterior surface of said output window in optical alignment with said first and scond masks.

6. The improvement in a light valve of the Schlieren dark field type as recited in claim 2 wherein said mask is formed on an exterior surface of said ouput window.

7. The improvement in a light valve of the Schlieren dark field type as recited in claim 6 further comprising a second mask positioned adjacent said disk on a side opposite said output window and in optical alignment with said first mentioned mask on said output window.

* * * * *